(12) United States Patent
Anastasakos et al.

(10) Patent No.: US 7,076,428 B2
(45) Date of Patent: Jul. 11, 2006

(54) METHOD AND APPARATUS FOR SELECTIVE DISTRIBUTED SPEECH RECOGNITION

(75) Inventors: Tasos Anastasakos, San Jose, CA (US); Senaka Balasuriya, Arlington Heights, IL (US); Michael Van Wie, Rochester, NY (US)

(73) Assignee: Motorola, Inc., Schaumburg, IL (US)

( * ) Notice: Subject to any disclaimer, the term of this patent is extended or adjusted under 35 U.S.C. 154(b) by 322 days.

(21) Appl. No.: 10/334,030

(22) Filed: Dec. 30, 2002

(65) Prior Publication Data

US 2004/0128135 A1    Jul. 1, 2004

(51) Int. Cl.
*G10L 21/00*    (2006.01)

(52) U.S. Cl. ............... 704/270.1; 704/275; 704/1; 704/231; 704/257; 704/255

(58) Field of Classification Search ............ 704/1–10, 704/270, 270.1, 272–275, 255, 257, 231, 704/260, 208, 211
See application file for complete search history.

(56) References Cited

U.S. PATENT DOCUMENTS

| | | | |
|---|---|---|---|
| 5,365,574 A | 11/1994 | Hunt et al. | |
| 5,956,683 A | 9/1999 | Jacobs et al. | |
| 6,006,183 A | 12/1999 | Lai et al. | |
| 6,119,087 A | 9/2000 | Kuhn et al. | |
| 6,122,613 A | 9/2000 | Baker | |
| 6,125,345 A | 9/2000 | Modi et al. | |
| 6,185,535 B1 | 2/2001 | Hedin et al. | |
| 6,292,781 B1 | 9/2001 | Urs et al. | |
| 6,377,922 B1 | 4/2002 | Brown et al. | |
| 6,505,153 B1 * | 1/2003 | Van Thong et al. | 704/211 |
| 6,584,439 B1 * | 6/2003 | Geilhufe et al. | 704/270 |
| 6,615,172 B1 * | 9/2003 | Bennett et al. | 704/257 |
| 6,633,846 B1 * | 10/2003 | Bennett et al. | 704/257 |
| 2001/0034250 A1 | 10/2001 | Chadha | |
| 2001/0036255 A1 | 11/2001 | Reformato et al. | |
| 2001/0047262 A1 * | 11/2001 | Kurganov et al. | 704/270.1 |
| 2001/0056350 A1 * | 12/2001 | Calderone et al. | 704/270 |
| 2002/0091518 A1 | 7/2002 | Baruch et al. | |
| 2002/0095295 A1 * | 7/2002 | Cohen et al. | 704/275 |
| 2002/0193989 A1 * | 12/2002 | Geilhufe et al. | 704/208 |
| 2003/0046074 A1 * | 3/2003 | Ruback et al. | 704/255 |
| 2003/0142801 A1 | 7/2003 | Pecht | |

OTHER PUBLICATIONS

Maes, Stephane H., "Multi-modal Web IBM Position," W3C/WAP Workshop, IBM Human Language Technologies, pp. 1-9.

* cited by examiner

*Primary Examiner*—Vijay Chawan
(74) *Attorney, Agent, or Firm*—Vedder, Price, Kaufman & Kammholz, P.C.

(57) ABSTRACT

An apparatus and method for selective distributed speech recognition includes a dialog manager (104) that is capable of receiving a grammar type indicator (170). The dialog manager (104) is capable of being coupled to an external speech recognition engine (108), which may be disposed on a communication network (142). The apparatus and method further includes an audio receiver (102) coupled to the dialog manager (104) wherein the audio receiver (104) receives a speech input (110) and provides an encoded audio input (112) to the dialog manager (104). The method and apparatus also includes an embedded speech recognition engine (106) coupled to the dialog manager (104), such that the dialog manager (104) selects to distribute the encoded audio input (112) to either the embedded speech recognition engine (106) or the external speech recognition engine (108) based on the corresponding grammar type indicator (170).

23 Claims, 5 Drawing Sheets

METHOD AND APPARATUS FOR SELECTIVE DISTRIBUTED SPEECH RECOGNITION

BACKGROUND OF THE INVENTION

The invention relates generally to speech recognition, and more specifically, to distributed speech recognition between a wireless device and a communication server.

With the growth of speech recognition capabilities, there is a corresponding increase in the number of applications and uses for speech recognition. Different types of speech recognition application and systems have been developed, based upon the location of the speech recognition engine with respect to the user. One such example is an embedded speech recognition engine, otherwise known as a local speech recognition engine, such as a Speech2Go speech recognition engine sold by Speech Works International, Inc., 695 Atlantic Avenue, Boston, Mass. 02111. Another type of speech recognition engine is a network-based speech recognition engine, such as Speech Works 6, as sold by Speech Works International, Inc., 695 Atlantic Avenue, Boston, Mass. 02111.

Embedded or local speech recognition engines provide the added benefit of reduced latency in recognizing a speech input, wherein a speech input includes any type of audible or audio-based input. One of the drawbacks of embedded or local speech recognition engines is that these engines contain a limited vocabulary. Due to memory limitations and system processing requirements, in conjunction with power consumption limitations, embedded or local speech recognition engines are limited to providing recognition to only a fraction of the speech inputs which would be recognizable by a network-based speech recognition engine.

Network-based speech recognition engines provide the added benefit of an increased vocabulary, based on the elimination of memory and processing restrictions. Although a downside is the added latency between when a user provides a speech input and when the speech input may be recognized, and furthermore provided back to the end user for confirmation of recognition. Other disadvantages include the requirement for continuous availability of the communication path, the resulting increased server load, and the cost to the user of connection and service. In a typical speech recognition system, the user provides the speech input and the speech input is thereupon provided to a server across a communication path, whereupon it may then be recognized. Extra latency is incurred in not only transmitting the speech input to the network-based speech recognition engine, but also transmitting the recognized speech input, or an N-best list back to the end user.

One proposed solution to overcoming the inherent limitations of embedded speech recognition engines and the latency problems associated with network-based speech recognition engines is to preliminarily attempt to recognize all speech inputs with the embedded speech recognition engine. Thereupon, a determination is made if the local speech recognition engine has properly recognized the speech input, based upon, among other things, a recognition confidence level. If it is determined that the speech input has not been recognized by the local speech recognition engine, such that a confidence level is below a threshold value, the speech input is thereupon provided to a network-based speech recognition engine. This solution, while eliminating latency issues with respect to speech inputs that are recognized by the embedded speech recognition engine, adds an extra latency step for all other inputs by first attempting to recognize the speech input locally. Therefore, when the speech inputs must be recognized using the network-based speech recognition engine, the user is required to incur a further delay.

Another proposed solution to overcoming the limitations of embedded speech recognition engines and network-based speech recognition engines is to attempt to recognize the speech input both at the local level, using the embedded speech recognition engine, and at the server level, using the network-based speech recognition engine. Thereupon, both recognized speech inputs are then compared and the user is provided with a best-guess at the recognized inputs. Once again, this solution requires the usage of the network-based speech recognition engine, which may add extra latency if the speech input is recognizable by the embedded speech recognition engine.

BRIEF DESCRIPTION OF THE DRAWINGS

The invention will be more readily understood with reference to the following drawings wherein.

DETAILED DESCRIPTION OF A PREFERRED EMBODIMENT

Briefly, a method and apparatus for selective distributed speech recognition includes receiving a plurality of grammar type indicators, wherein a grammar type indicator is a class of speech recognition patterns associated with a plurality of grammar class entries. The grammar class entries are elements within the class that is defined by the grammar class. For example, a grammar type indicator may be 'DAYS OF THE WEEK,' containing the grammar type indicator entries of Monday, Tuesday, Wednesday, Thursday, Friday, Saturday, Sunday, yesterday and tomorrow. The grammar type indicator furthermore includes an address to the grammar class stored within a speech recognition or may include the grammar class itself, consisting of a tagged list of the grammar class entries or may include a Universal Resource Identifier (URI) that points to a resource on the network where the grammar class is available. In another embodiment, the grammar type indicator may include a pointer to a specific speech recognition engine having the grammar class therein.

The method for selective distributed speech recognition further includes receiving a speech input that corresponds to one of the grammar class entries. As discussed above, a speech input is any type of audio or audible input, typically provided by an end user, that is to be recognized using a speech recognition engine and an action is thereupon to be performed in response to the recognized speech input. The method and apparatus further limits recognition to either an embedded speech recognition engine or an external speech recognition engine, based on the grammar type indicator. In one embodiment, the embedded speech recognition engine is embedded within the apparatus for distributed speech recognition engine, also referred to as a local speech recognition engine, as discussed above, and the external speech recognition engine may be a network-based speech recognition engine, also as discussed above.

Thereupon, the method and apparatus selectively distributes the speech input to either the embedded speech recognition engine or the external speech recognition engine, such as the network-based speech recognition engine, based on the specific grammar type indicator. More specifically, the speech input is encoded into an encoded audio input and the encoded audio input, which represents an encoding of the speech input, is provided to the selected speech recognition engine. Furthermore, the speech input is expected to correspond to one of the grammar class entries for the specific grammar type indicator.

Figure 1:
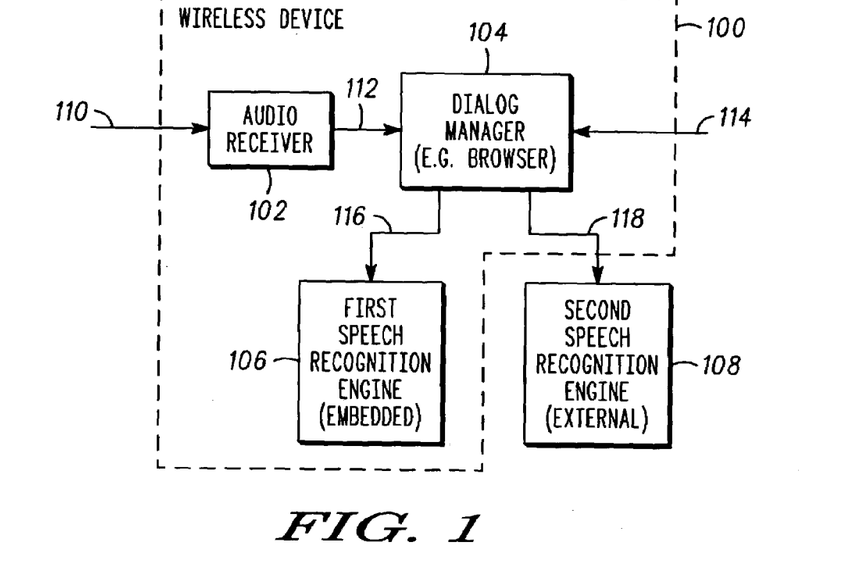
FIG. 1 illustrates one example of an apparatus for distributed speech recognition.

FIG. 1 illustrates a wireless device 100 that includes an audio receiver 102, a dialog manager 104, such as a multi-modal browser or a voice browser, and a first speech recognition engine 106, such as an embedded speech recognition engine. The wireless device 100 may be any device capable of receiving communication from a wireless or non-wireless device or network, a server or other communication network. The wireless device 100 includes, but is not limited to, a client device such as a cellular phone, a laptop computer, a desktop computer, a pager, a smart phone, or other wireless devices such as a personal digital assistant, or any other suitable device capable of receiving communication as recognized by one having ordinary skill in the art. The dialog manager 104, which may be a multi-modal browser capable of reading and outputting mark-up language for multiple modes, such as, but not limited to, graphic and voice mode, is operably coupleable to a second speech recognition engine 108, such as an external speech recognition engine which may be a network based speech recognition engine.

In one embodiment, the dialog manager 104 is operably coupleable to the second speech recognition engine 108 through a communication network, not shown. Furthermore, the second speech recognition engine 108 may be disposed on a communication server, not shown, wherein a communication server includes any type of server in communication with the communication network, such as communication through an internet, an intranet, a proprietary server, or any other recognized communication path for providing communication between the wireless device 100 and the communication server, as illustrated below in FIG. 3.

The audio receiver 102 receives a speech input 110, such as provided from an end user. The audio receiver 102 receives the speech input 110, encodes the speech input 110 to generate an encoded audio input 112 and provides the encoded audio input 112 to the dialog manager 104. The dialog manager 104 receives a plurality of grammar type indicators 114. As discussed below, the grammar type indicators may be provided across the communication network (not shown), from one or more local processors executing a local application disposed within the communication device, or may be provided from any other suitable location any recognized by one having ordinary skill in the art.

The dialog manager 104 receives the encoded audio input 112 from the audio receiver 102 and, based on the grammar type indicators 114, selects either the first speech recognition engine 106 or the second speech recognition engine 108 to recognize the encoded audio input 112. As discussed below, the grammar type indicators contain indicators as to which speech recognition engine should be utilized to recognize a speech input, based on the complexity of the expected speech input and the abilities and/or limitations of the first speech recognition engine 106. When the encoded audio input 116 is thereupon provided to the first speech recognition engine 106 disposed within the wireless device 100, the speech recognition is performed within the wireless device 100. When the encoded audio input 118 is provided to the second speech recognition engine 108, the encoded audio input 118 is transmitted across a communication interface, not shown, due to the second speech recognition engine 108 being external to the wireless device 100. As recognized by one having ordinary skill in the art, elements within the communication device 100 have been omitted from FIG. 1 for clarity purposes only.

Figure 2:
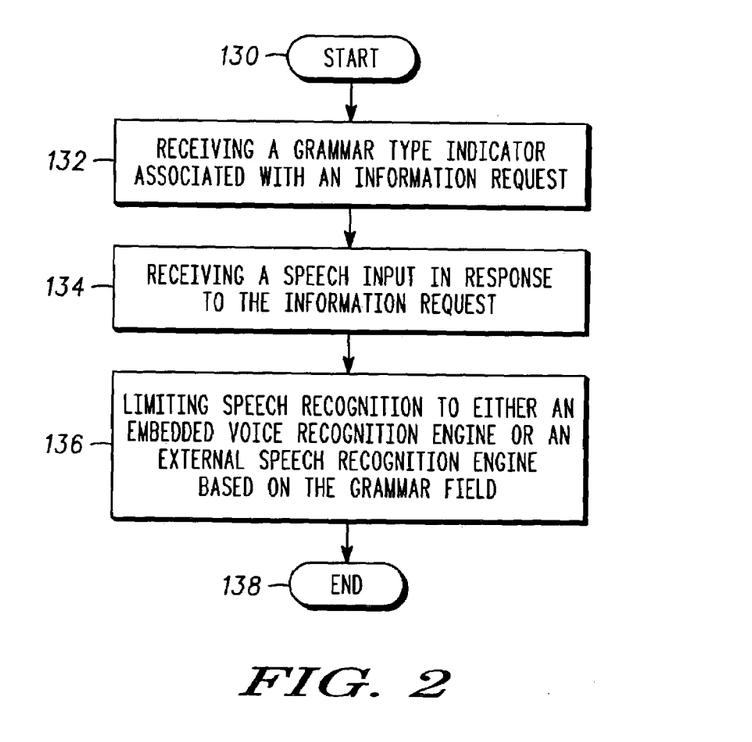
FIG. 2 illustrates one example of a method for distributed speech recognition.

FIG. 2 illustrates a flow chart representing the steps of the method for distributed speech recognition. The method begins 130 by receiving a grammar type indicator having one or more grammar class entries, such as the grammar type indicators 114 of FIG. 1, wherein the grammar type indicator is associated with an information request, step 132. In the above example, the grammar type indicator may represent days of the week and the grammar type indicator entries are the possible elements of the class defined by the grammar type indicator, such as Monday, Tuesday, et. al. In another embodiment, the grammar type indicator may be a grammar indicator, such as a universal resource identifier (URI) to a specific grammar class. Moreover, in another embodiment, the grammar type indicator may be a pointer to a specific speech recognition engine having the specific grammar class disposed therein. Next, step 134, a speech input corresponding to one of the grammar class entries of the grammar type indicator is received, in response to the information request. This speech input, such as encoded audio input 112 corresponds to one of the entries in the grammar type indicator based upon a user prompt provided to the end user across the client device 100. In other words, the user is requested to provide a speech input 110 that is expected to fall within the grammar class.

Thereupon, step 136, speech recognition is limited to the embedded speech recognition engine or the external speech recognition engine based on the grammar type indicator in comparison to a grammar type capability signal. A grammar type capability signal includes an indication of recognition complexity level of the embedded speech recognition engine. The recognition complexity level corresponds to how many words, or phrases the speech recognizer can handle using the available device resources. The recognition complexity increases as the recognizable language set increases. Usually the recognizable phrases are represented for the speech recognizer needs as a finite state network of nodes and arcs. The recognition complexity level would be, for example, that the recognition is limited to such networks of 50 nodes. There exists other implementations and variations of the recognition complexity level that could be applied and would fall within the scope of this disclosure. As such, the speech recognition to be performed by either the embedded speech recognition engine 106 or the external speech recognition engine 114 is thereupon selectively distributed based upon the expected complexity of the speech input 110 as determined by the grammar type indicator 114 and the grammar type indicator entries, step 208.

Figure 3:
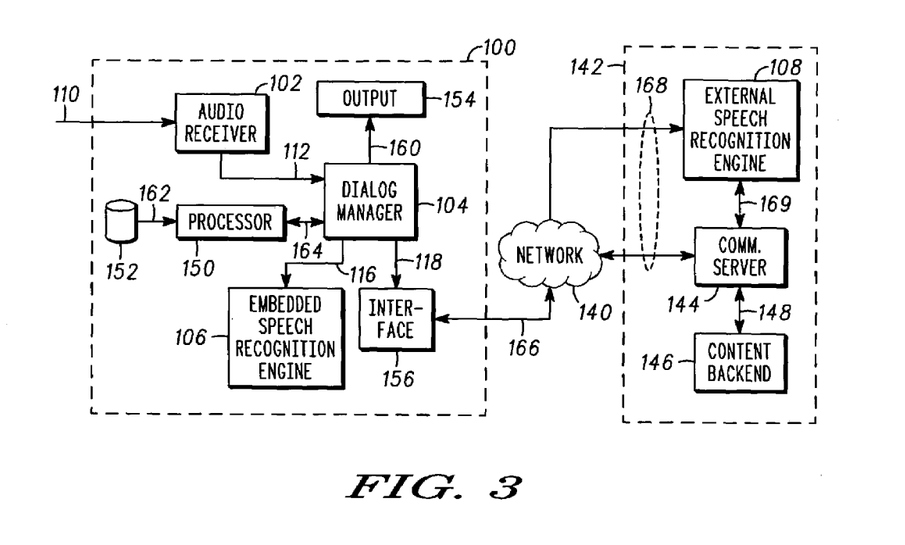
FIG. 3 illustrates another example of the apparatus for distributed speech recognition.

FIG. 3 illustrates the apparatus for selective distributed speech recognition of FIG. 1 with a communication network 140 and an information network 142, wherein the information network 142 includes a communication server 144, the external speech recognition engine 108 and a content backend 146. The communication network 140 may be a wireless area network, a wireless local area network, a cellular communication network, or any other suitable network for providing communication information between the wireless device 100 and the information network 142 as recognized by one having ordinary skill in the art. The information network 142 may be an internet, an intranet, a proprietary network, or any other network allowing for the communication of the content backend 146 with the communication server 144 and the communication server 144 with the external speech recognition engine 108. Moreover, the content backend 146 includes any type of database or executable processor wherein content information 148 may be provided to the communication server 144, either automatically, upon request from the communication server, or in response to any other request as provided thereto, as recognized by one having ordinary skill in the art.

The wireless device 100 includes the audio receiver 102, the dialog manager 104, the embedded speech recognition engine 108, a processor 150, a memory 152, an output device 154, and a communication interface 156 for interfacing across the communication network 140. The processor 150 may be, but not limited to, a single processor, a plurality of processors, a DSP, a microprocessor, ASIC, state machine, or any other implementation capable of processing and executing software or discrete logic or any suitable combination of hardware, software and/or firmware. The term processor should not be construed to refer exclusively to hardware capable of executing software, and may implicitly include DSP hardware, ROM for storing software, RAM, and any other volatile or non-volatile storage medium. The memory 152 may be, but not limited to, a single memory, a plurality of memory locations, shared memory, CD, DVD, ROM, RAM, EEPROM, optical storage, or any other non-volatile storage capable of storing digital data for use by the processor 150. The output device 154 may be a speaker for audio output, a display or monitor for video output, or any other suitable interface for providing an output, as recognized by one having ordinary skill in the art.

In one embodiment, the wireless device 100 provides an embedded speech recognition engine capability signal to the communication server 144 through the communication network 140. The embedded speech recognition engine capability signal indicates the level of complexity of encoded audio inputs that the embedded speech recognition can handle, such as a limited number of finite state grammar (FSG) nodes. The communication server 144, in response to the embedded speech recognition engine capability signal, provides a plurality of grammar type indicators to the dialog manager, wherein each grammar type indicator includes an indicator as to which speech recognition is to be utilized for recognizing the corresponding encoded audio input. In one embodiment, the grammar type indicators are embedded within a mark-up language page, such that the dialog manager 104 receives the mark-up language page and thereupon constructs an ordered interface for use by an end user, such as a multiple entry form, wherein the dialog manager, in response to the mark-up language, requests a first entry, upon receipt and confirmation, requests a second entry, and thereupon further entries as indicated by the mark-up page.

In another embodiment the dialog manager 104 may be disposed within the communication server 142 such that it controls the dispatch of the mark-up content from the content back end 146 to the client device over the network 140 and it is coupled with some client mark-up browser. For example, a Voice XML browser similar to the dialog manager 104, may be disposed on the communication server 144, GUI browser may be disposed on the wireless device 100 with submodule for selection of recognition engine.

Figure 4:
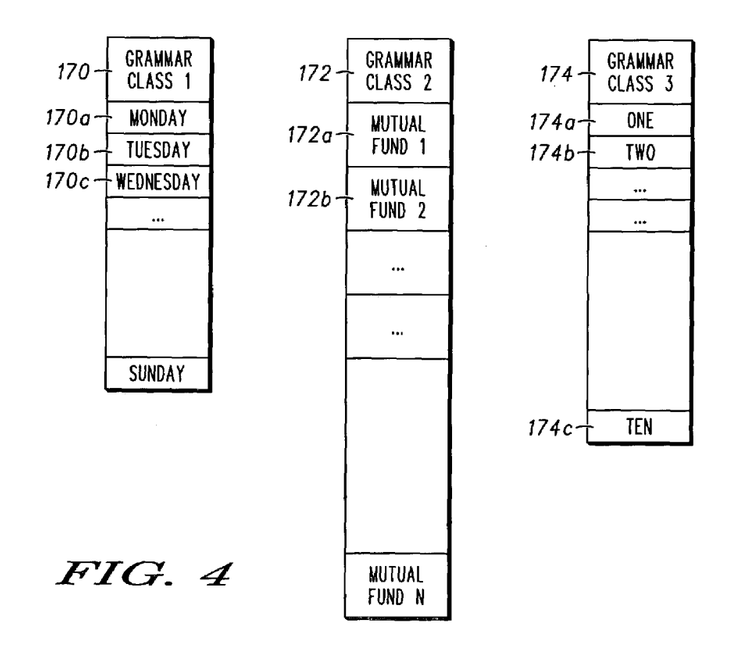
FIG. 4 illustrates an example of a plurality of grammar type indicators.

Referring now to FIG. 4 for further delineation, FIG. 4 illustrates three exemplary grammar classes with a plurality of grammar class entries. The first grammar class 170 contains days of the week, having grammar class entries of Monday 170a, Tuesday 170b, Wednesday 170c, et. al. The second grammar class 172 contains names of mutual funds, as may be provided from a financial services communication server, such as the communication server 144. The second grammar class entries are names of various mutual funds that a user may select, such as Mutual Fund 1 172a, Mutual Fund 2 172b. A third grammar class 174 contains numbers as the grammar class entries, such as a user may enter for purposes of an account number, a personal identification number, a quantity number, or any other suitable numerical input, such as one 174a, two 174b and ten 174c.

Referring back now to FIG. 3, the dialog manager 104 in response to the mark-up language page, provides an output request 160 to the output device 154. The output device 154 thereupon provides an output to an end user, not shown. In response to the output device 154, the end user provides a speech input 110 to the audio receiver 102. Similar to the above description with respect to FIG. 1, the audio receiver 102 encodes the speech input 110 into an encoded audio input 112, which is provided to the dialog manager 104.

The wireless device 100 further includes the processor 150 coupled to the memory 152 wherein the memory 152 may provide executable instructions 162 to the processor 150. Thereupon, the processor 150 provides application instructions 164 to the dialog manager 104. The application instructions may contain, for example, instructions to provide connection with the communication server 144 and provide the terminal capability signal to the communication server 144. In another embodiment, the processor 150 may be disposed within the dialog manager 104 and receives the executable instructions 162 directly within the dialog manager 104.

As discussed above, when the dialog manager 104 receives the encoded audio input 112, based upon the grammar 114 of FIG. 1, the dialog manager 104 selects either the embedded speech recognition engine 106 or the external speech recognition engine 108. When the external speech recognition engine 108 is selected, the encoded audio input 118 is provided to the interface 156 such that it may be transmitted to the external speech recognition engine 108 across the communication network 140. The interface 156 provides for a wireless communication 166 and thereupon the wireless device 100 may provide a communication 168 to the information network 142.

As recognized by one having ordinary skill in the art, the network 140 may be operably coupled directly to the communication server 144 across communication path 168 and the dialog manager 104 may interface the external speech recognition 108 through the communication server 144 or the dialog manager 104 may be directly coupled through the network interface 156 through the communication network 140. When the external speech recognition engine 108 receives the encoded audio input 118, the encoded audio input 118 is recognized in accordance with known speech recognition techniques. The recognized audio input 169 is thereupon provided back to the dialog manager 104. Once again, as recognized by one having ordinary skill in the art, the recognized audio input 169 may be provided through the communication server 144 through the communication network 140 and back to the interface 156 within the wireless device 100.

In another embodiment, the embedded speech recognition engine 106 or the external speech recognition 108, based upon which engine is selected by the dialog manager 104, may be provided an N-best list to the dialog manager and further level of feedback may be performed, wherein the user is provided the top choices for recognized audio and thereupon further selects the appropriate recognized input or the user can select an action to correct the input if the desired input is not present.

Figure 5:
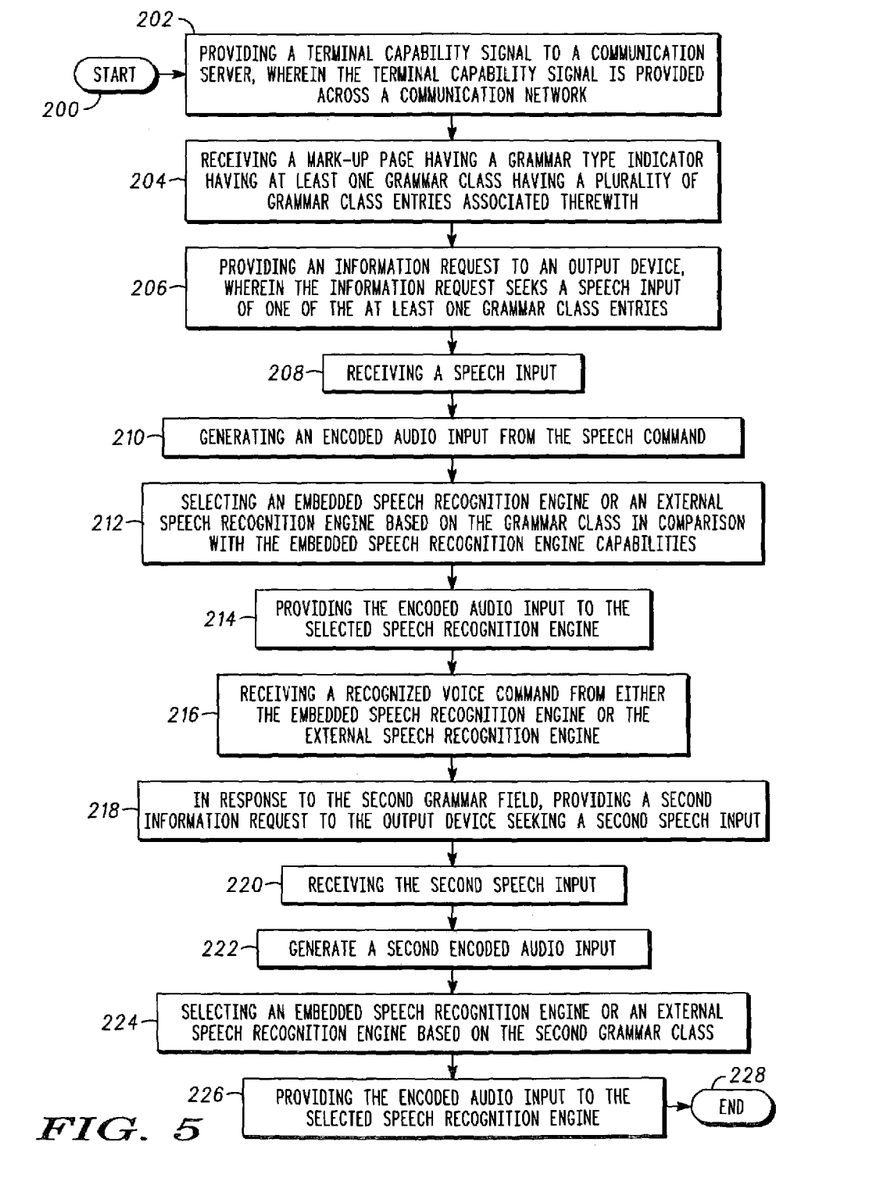
FIG. 5 illustrates another example of a method for distributed speech recognition.

FIG. 5 illustrates the method for distributed speech recognition in accordance with one embodiment. The method begins 200 by providing a terminal capability signal to a communication server, wherein the terminal capability signal is provided across a communication network, step 202. As illustrated with respect to FIG. 3, the terminal capability signal is provided from the dialog manager 104 through the interface 156 across the communication network 140 to the communication server 144. In one embodiment, the terminal capability signal is provided as part of the service session initiation that happens when the wireless device 100 connects to the communication server 144. The next step, step 204, is receiving a mark-up page having a grammar type indicator having at least one grammar class entry with a plurality of grammar class entries associated therewith. The mark-up page may be encoded with any recognized mark-up language, such as, but not limited to, VoiceXML, SALT and XHTML, with the grammar type indicators, such as grammar type indicators 170, 172 and 174 of FIG. 4.

Thereupon an information request is provided to an output device, wherein the information request seeks a speech input of one of the at least one grammar class entries, step 206. As discussed with respect to FIG. 3, the information request 160 is provided to the output device 154 and the speech input 110 is typically provided from an end user. The next step is receiving a speech input, step 208. The speech input 110 is typically provided by an end user and is expected to correspond to at least one of the grammar class entries, for example with respect to FIG. 4, the speech input would be expected to be one of the grammar class entries, such as Monday or Tuesday for the first grammar class 170.

An encoded audio input is generated from the speech input, step 210. In one embodiment, the audio receiver 102 receives the speech input 110 and thereupon generates the encoded audio input 112. The next step, step 212, is selecting an embedded speech recognition engine or an external speech recognition engine based on the grammar type indicator. In one embodiment, the dialog manager 104 makes this selection based on the grammar type indicators received within the original mark-up page. Thus, the encoded audio input is provided to the selected speech recognition engine.

The next step, step 216, is receiving a recognized voice input from either the embedded speech recognition engine or the external speech recognition engine, based upon which speech recognition engine was chosen and the encoded audio input provided thereto. The dialog manager 104 receives the recognized voice input and associates the recognized voice input as an entry for a specific field.

In one embodiment, the method for selective distributed speech recognition further includes providing a second information request to the output device, in response to the second grammar type indicator, step 218. The second information request seeks a second speech input, such as the speech input 110, typically provided by an end user. Thereupon, the second speech input is received within the audio receiver 102, step 220. The audio receiver once again generates a second encoded audio input, step 222 and provides the encoded audio input to the dialog manager 104 whereupon the dialog manager once again selects either the embedded speech recognition engine 106 or the external speech recognition engine 108 based on the grammar type indicator, step 224. The second encoded audio input is provided to the selected speech recognition engine, step 226. As such, a second recognized audio input is generated and provided back to the dialog manager 104 from the selected speech recognition engine.

Thereupon, the method is complete, step 228. As recognized by one having ordinary skill in the art, the method for selective distributed speech recognition is continued for each grammar type indicator, for example, if the mark-up page contains ten fields, the dialog manager would seek ten speech inputs and the audio receiver 102 would generate ten different encoded audio inputs and the dialog manager 104 would thereupon choose at ten different intervals for each specific grammar type indicator which specific speech recognition engine to perform the selective speech recognition.

Figure 6:
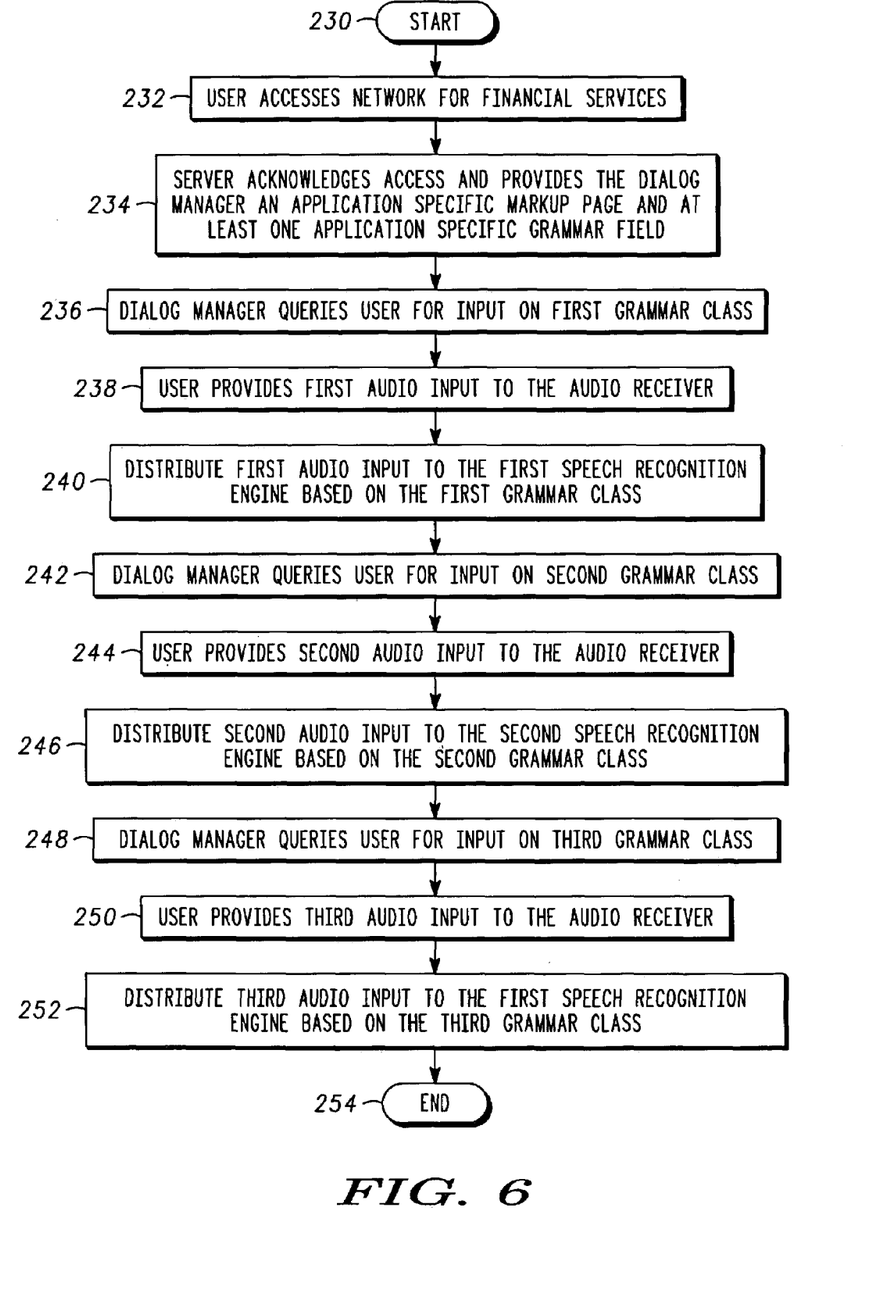
FIG. 6 illustrates an example of a method of an application utilizing distributed speech recognition.

FIG. 6 illustrates an exemplary method for selective distributed speech recognition using the embodiment of a financial services network. The method begins, step 230, when a user accesses a network for financial services, step 232. Next, the server acknowledges access and provides the dialog manager an application specific mark-up page and at least one application specific grammar type indicator, step 234. In response thereto, the dialog manager queries the user for a speech input based on the first grammar class, step 236.

The user provides the audio input to the audio receiver, step 238. The wireless device thereupon distributes the first audio input to the first speech recognition engine based on the first grammar type indicator, step 240. In this embodiment, the first grammar type indicator contains an indication to have the encoded audio input recognized by the embedded speech recognition engine based upon the complexity of the grammar class entries.

Next, the dialog manager queries the user for a second speech input based on a second grammar class, step 242. The user provides the second audio input to the audio receiver, step 244. The wireless device distributes the second audio input to the second speech recognition engine based on the second grammar type indicator, step 246, wherein the second grammar type indicator indicates a level of complexity beyond the speech recognition capabilities of the embedded speech recognition engine. Once again, the dialog manager queries the user for a third speech input, this time based on a third grammar class, step 248. The user provides the third audio input to the audio receiver, step 250. The wireless device distributes the third audio input to the first speech recognition engine based on the third grammar type indicator, wherein the third grammar type indicator, similar to the first grammar type indicator indicates recognition capabilities within the ability of the embedded speech recognition engine 106. Thereupon, the method is complete, step 254 and all of the entries for the application specific mark-up page have been completed.

Figure 7:
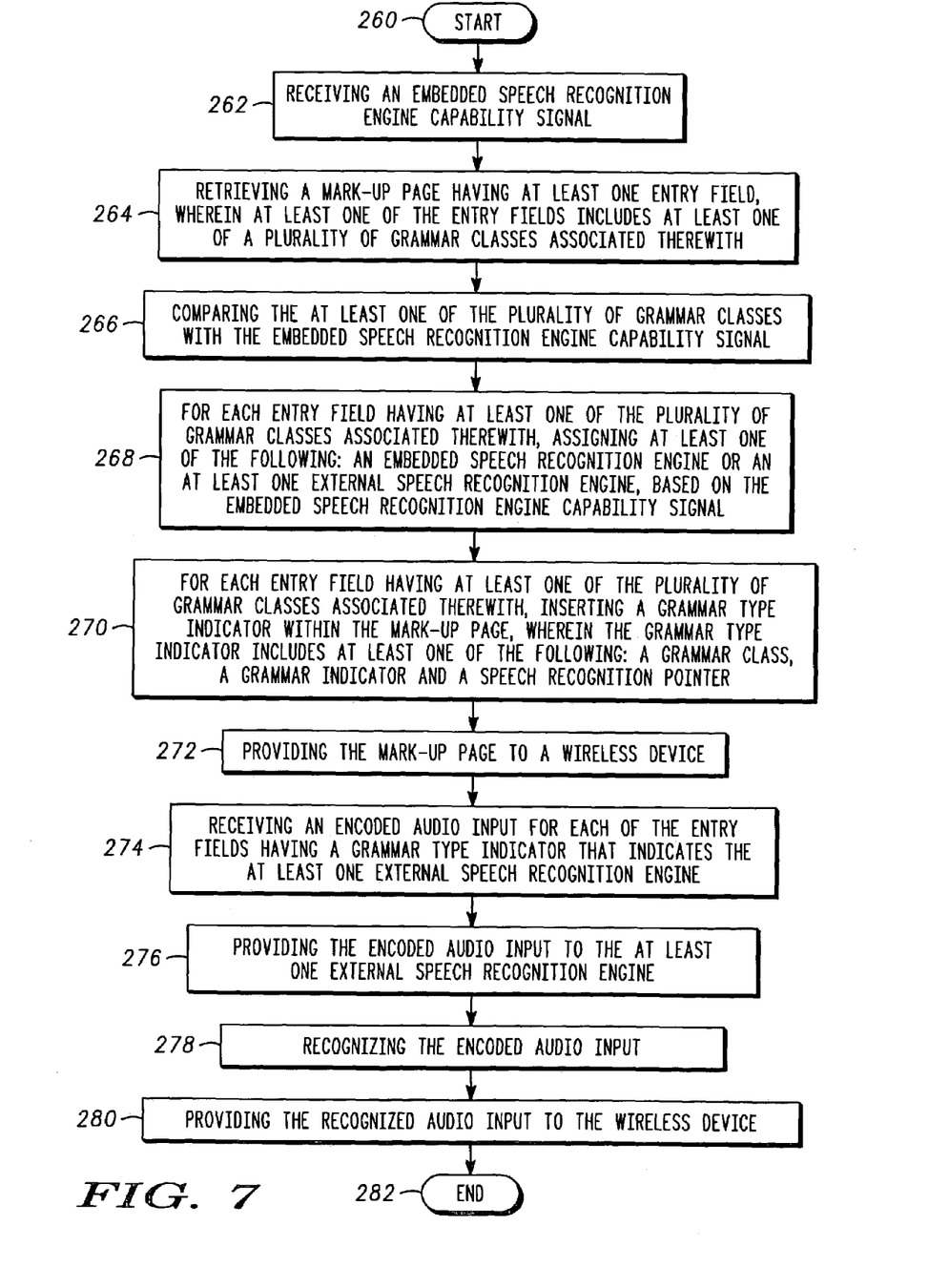
FIG. 7 illustrates an example of an embodiment of a method for distributed speech recognition.

FIG. 7 illustrates one example of another embodiment of a method for selective distributed speech recognition. The method begins, step 260, by receiving an embedded speech recognition engine capability signal, step 262. As discussed above, the embedded speech recognition engine capability signal indicates the level of complexity of which the embedded speech recognition engine within the wireless device may properly and effectively recognize an included audio input. The next step, step 262, includes retrieving a mark-up page having at least one entry field, wherein at least one of the entry fields includes at least one of a plurality of grammar classes associated therewith. The at least one entry field includes fields for an interactive mark-up page wherein a user typically provides an input to the entry field.

The next step is comparing the at least one of the plurality of grammar classes with the embedded speech recognition engine capability signal, step 266. Thereupon, for each entry field having at least one of the plurality of grammar classes associated therewith, assigning either the embedded speech recognition engine or an external speech recognition engine to conduct the speech recognition, based upon the embedded speed recognition capability signal, step 268.

Thereupon, for each entry field having at least one of the plurality of grammar classes associated therewith, the method includes inserting a grammar type indicator within the mark-up page, wherein the grammar type indicator includes either a grammar class, a grammar indicator, a speech recognition pointer, or any other suitable notation capable of directing a dialog manager or multi-modal browser to a particular speech recognition engine, step 270.

Thereupon, step 272, the mark-up page is provided to a wireless device, such as the wireless device 100 of FIG. 1. Furthermore, the method includes receiving an encoded audio input for each of the entry fields having a grammar type indicator that indicates the selection of the external speech recognition engine, step 274.

The method further includes providing the encoded audio input to the external speech recognition engine, step 276. Thereupon, the encoded audio input is recognized, step 278 and a recognized audio input is provided to the wireless device, step 280. Thereupon, the method for selected distribution from the perspective of a communication server, such as communication server 144 of FIG. 3 is complete.

In another embodiment, the grammar type indicator, such as 170, is embedded within the mark-up page provided to the wireless device 100, such that the wireless device 100 may selectively choose which speech recognition engine is enabled based on an embedded speech recognition engine capability signal. Furthermore, one embodiment allows for a user to override the selected speech recognition through the active de-selection of the selected speech recognition engine. For example, the embedded speech recognition 106 may be unreliable due to excess ambient noise, therefore even though the embedded speech recognition engine 106 may be selected, the external speech recognition 108 may be utilized. In another embodiment, the wireless device 100 may provide a zero capability signal which represents the terminal capability signal indicates the embedded speech recognition engine 106 have zero recognition capability, in essence providing for all speech recognition to be performed by the external speech recognition engine 108.

It should be understood that there exists implementations of other variations and modifications of the invention and its various aspects, as may be readily apparent to those of ordinary skill in the art, and that the invention is not limited by the specific embodiments described herein. For example, a plurality of external speech recognition engines may be utilized across a communication network 140 such that further levels of selective distributed speech recognition may be performed on the communication server side in that a server-side speech recognition engine may be more aptly suited for a particular input such as numbers, and there still exists the original determination of whether the encoded audio input may be recognized with the embedded speech recognition engine 106 or is outside of the embedded speech recognition engine 106 capabilities. It is therefore contemplated and covered by the present invention, any and all modifications, variations, or equivalence that fall within the spirit and scope of the basic underlying principals disclosed and claimed herein.

What is claimed is:

1. A method for selective distributed speech recognition comprising:
    determining a grammar type capability and in response receiving a grammar type indicator associated with an information request;
    receiving a speech input in response to the information request; and
    limiting speech recognition to at least one of: a first speech recognition engine and at least one second speech recognition engine, based on the grammar type indicator in comparison to the grammar type capability of the embedded speech recognition engine.

2. The method of claim 1 further comprising:
    providing the speech input to the selected at least one of the following: the first speech recognition engine and the at least one second speech recognition engine.

3. The method of claim 2 further comprising:
    generating an encoded audio input from the speech input; and
    associating the encoded audio input as a response to the information request.

4. The method of claim 1, wherein the grammar type indicator includes at least one of the following: a grammar class, a grammar indicator and a speech recognition pointer.

5. The method of claim 1 further comprising:
    prior to receiving the grammar type indicator, accessing a server and providing a terminal capability signal to the server; and
    receiving the grammar type indicator from the server in response to the terminal capability signal.

6. The method of claim 5 further comprising:
    receiving a mark-up page including the grammar type indicator and an ordering scheme for the information request.

7. The method of claim 1 wherein the first speech recognition engine is an embedded speech recognition engine and the at least one second speech recognition engine is an at least one external speech recognition engine, wherein the embedded speech recognition engine is disposed within a wireless device and the at least one external speech recognition engine is disposed on a communication server.

8. A wireless device comprising:
    a dialog manager capable of receiving a grammar type indicator, the dialog manager being operably coupleable to at least one external speech recognition engine;
    an audio receiver operably coupled to the dialog manager such that the audio receiver receives a speech input and provides an encoded audio input to the dialog manager; and
    an embedded speech recognition engine operably coupled to the dialog manager such that the dialog manager provides the encoded audio input to at least one of the following: the embedded speech recognition engine and the at least one external speech recognition engine, based the grammar type indicator in response to a grammar type capability of the embedded speech recognition engine.

9. The wireless device of claim 8 wherein:
    the grammar type indicator includes at least one of the following: a grammar class, a grammar indicator that indicates the grammar class and a speech recognition pointer that points to at least one of the following: the embedded speech recognition and the at least one external speech recognition which contain the grammar class; and the grammar class includes a plurality of grammar class entries.

10. The wireless device of claim 9, wherein the dialog manager is operably coupleable to the at least one external speech recognition engine through a communication network.

11. The wireless device of claim 9, wherein the grammar type indicator is received from a communication server through a communication network.

12. The wireless device of claim 11 further comprising:
a communication interface operably coupled to the dialog manager such that the dialog manager may receive the grammar type indicator from the communication server.

13. The wireless device of claim 9 further comprising:
an output device operably coupled to the dialog manager such that the output device may output a data request in response to the grammar type indicator, such that the speech input is expected to correspond to at least one of the grammar type entries.

14. An apparatus for selective distributed speech recognition comprising:
an embedded speech recognition engine;
a memory storing executable instructions;
a processor operably coupled to the embedded speech recognition engine and the memory and operably coupleable to at least one external speech recognition engine, wherein the processor, in response to the executable instructions:
  receives a grammar type indicator, wherein the grammar type indicator includes at least one of the following: a grammar class, a grammar indicator that indicates the grammar class and a speech recognition pointer that points to at least one of the following: the embedded speech recognition and the at least one external speech recognition which contain the grammar class, wherein the grammar class includes a plurality of grammar class entries;
  provides an information request to an output device;
  receives a speech input corresponding to one of the grammar class entries;
  encodes the speech input as an encoded audio input;
  associates the encoded audio input as a response to the information request; and
  selects at least one of: the embedded speech recognition engine and the at least one external speech recognition engine, based on the grammar type indicator in comparison to a grammar capability of the embedded speech recognition engine.

15. The apparatus of claim 14 wherein the processor, in response to executable instructions:
  accesses a communication server through a communication network; and
  provides a terminal capability signal to the communication server.

16. The apparatus of claim 15 wherein the grammar type indicator is received from the communication server in response to the terminal capability signal.

17. A method for selective distributed speech recognition comprising:
receiving an embedded speech recognition engine capability signal;
retrieving a mark-up page having at least one entry field, wherein at least one of the entry fields includes at least one of a plurality of grammar classes associated therewith;
comparing the at least one of the plurality of grammar classes with the embedded speech recognition engine capability signal; and
for each entry field having at least one of the plurality of grammar classes associated therewith, assigning at least one of the following: an embedded speech recognition engine or an at least one external speech recognition engine, based on the embedded speech recognition engine capability signal.

18. The method of claim 17 further comprising:
for each entry field having the at least one of the plurality of grammar classes associated therewith, inserting a grammar type indicator within the mark-up page; and
providing the mark-up page to a wireless device.

19. The method of claim 18 further comprising:
receiving an encoded audio command for each of the entry fields having a grammar type indicator that indicates the at least one external speech recognition engine;
providing the encoded audio command to the at least one external speech recognition engine;
recognizing the encoded audio command; and
providing a recognized audio command to the wireless device.

20. The method of claim 17, wherein the grammar type indicator includes at least one of the following: a grammar class, a grammar indicator and a speech recognition pointer.

21. A method for distributed speech recognition comprising:
providing a terminal capability signal to a communication server, wherein the terminal capability signal is provided across a communication network;
receiving a mark-up page having a grammar type indicator, wherein the grammar type indicator includes at least one of the following: a grammar class, a grammar indicator that indicates the grammar class and a speech recognition pointer that points to at least one of the following: the embedded speech recognition and the at least one external speech recognition which contain the grammar class, wherein the grammar class includes a plurality of grammar class entries;
in response to the grammar type indicator, providing an information request to an output device, wherein the information request seeks a speech input expected to correspond to at least one of the grammar class entries;
receiving the speech input;
generating an encoded audio input from the speech input;
selecting at least one of the following: an embedded speech recognition engine and at least one external speech recognition engine, based on the grammar type indicator in comparison to a grammar type capability of the embedded speech recognition engine;
if the embedded speech recognition engine is selected, providing the encoded audio input to the embedded speech recognition engine; and
if the at least one external speech recognition engine is selected, providing the encoded audio input to the at least one external speech recognition engine.

22. The method of claim 21 wherein the mark-up page includes a second grammar type indicator having a plurality of second grammar class entries, the method further comprising:

in response to the second grammar type indicator, providing a second information request to the output device, wherein the second information request seeks a second speech input expected to correspond to at least one of the second grammar class entries;

receiving the second speech input;

generating a second audio encoded input;

selecting at least one of the following: the embedded speech recognition engine and the at least one external speech recognition engine, based on the second grammar type indicator;

if the embedded speech recognition engine is selected, providing the second encoded audio input to the embedded speech recognition engine; and if the second speech recognition engine is selected, providing the second encoded audio input to the at least one external speech recognition engine.

23. A method for selective distributed speech recognition comprising:

receiving a grammar type indicator associated with an information request;

receiving a speech input in response to the information request;

limiting speech recognition to at least one of: a first speech recognition engine and at least one second speech recognition engine, based on the grammar type indicator in comparison to a grammar type capability of the embedded speech recognition engine;

prior to receiving the grammar type indicator, accessing a server and providing a terminal capability signal to the server; and receiving the grammar type indicator from the server in response to the terminal capability signal.

* * * * *